US007869842B2

(12) United States Patent  (10) Patent No.: US 7,869,842 B2
Kim et al.  (45) Date of Patent: Jan. 11, 2011

(54) FOLDER TYPE PORTABLE TERMINAL WITH VARIABLE-TYPE GROUNDING UNIT

(75) Inventors: Jae-Ho Kim, Suwon-si (KR); Hun-Jong Jeong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1132 days.

(21) Appl. No.: 11/489,343

(22) Filed: Jul. 19, 2006

(65) Prior Publication Data

US 2007/0021158 A1  Jan. 25, 2007

(30) Foreign Application Priority Data

Jul. 20, 2005  (KR) .................... 10-2005-0065541

(51) Int. Cl.
*H04M 1/00* (2006.01)
(52) U.S. Cl. ............... 455/575.3; 455/550.1; 455/575.1
(58) Field of Classification Search ............. 455/550.1, 455/575.1–575.7, 556.2; 343/702
See application file for complete search history.

(56) References Cited

U.S. PATENT DOCUMENTS

2001/0034242 A1* 10/2001 Takagi .................... 455/575.3
2004/0142735 A1* 7/2004 Yi ........................... 455/575.3
2004/0185924 A1* 9/2004 Hwang et al. ............ 455/575.3
2006/0092081 A1* 5/2006 Kanazawa ................ 343/702

FOREIGN PATENT DOCUMENTS

KR  10-2003-0027512  4/2003
KR  10-2004-0063235  7/2004

* cited by examiner

*Primary Examiner*—Kamran Afshar
(74) *Attorney, Agent, or Firm*—The Farrell Law Firm, LLP

(57) ABSTRACT

The present invention relates to a folder or hinge type portable terminal having a grounding unit. A main body has a main board. A folder opens and closes at an angle from the main body. At least one component of a hinge module is formed of a metallic material, and opens and closes the folder at an angle from the main body. A connecting means selectively contacts a grounding portion of the main board to the material components of the hinge module in response to the opening and closing operation of the folder, to provide optimal antenna radiation characteristic irrespective of the opening and closing operation of the folder.

24 Claims, 9 Drawing Sheets

FOLDER TYPE PORTABLE TERMINAL WITH VARIABLE-TYPE GROUNDING UNIT

PRIORITY

This application claims priority under 35 U.S.C. §119 to an application entitled "Folder type portable terminal with variable-type grounding unit" filed in the Korean Intellectual Property Office on Jul. 20, 2005 and assigned Serial No. 2005-65541, the contents of which are incorporated herein by reference.

BACKGROUND OF THE INVENTION

1. Field of the Invention

The present invention relates generally to a grounding unit of a folder type portable terminal, and in particular, to a portable terminal configured to have a variable-type grounding unit for performing variable ground operation in response to opening and closing of the folder, in order to prevent the degradation of antenna radiation from opening and closing of the folder.

2. Description of the Related Art

In recent years, the dramatic development of electronic communications has caused to be realized portable terminals that not only have a lightweight and small size, but also a large variety of functions that appeal to the consumer. For example, a speaker capable of outputting a melody with various harmonies i and a color display unit with a vast array of pixels are being implemented. In addition to the typical function of call communication, because such functions as listening to music via an MPEG audio layer-3 (MP3) player and a variety of game contents using the display unit are also being provided, there has been an increased concentration on the development of advanced functions.

Portable terminals are manufactured in a variety of types, which are generally classified according to their opening and closing operation for call communication. In particular, various types of terminals such as bar type, flip type, folder type, slide type, popup type and slide and rotation type terminals have been developed.

These portable terminals are equipped with an antenna module for portable wireless communication reception. Such an antenna module can be a built-in antenna module installed within the terminal as well as an external antenna module that protrudes from the terminal. Various efforts are made to show the best performance. Thus, the design and proper positioning of the antenna is of particular importance, for producing optimal performance of the terminal, especially when considering the variety of opening and closing operations in the various types of terminals.

For example, the folder type terminal can have an external antenna module protruding from the terminal or an antenna radiator installed in the terminal. Also, the folder type terminal can be configured such that its folder is electrically grounded to a hinge module opening at an angle from the body to improve the radiation of the antenna. The hinge module forms at least a hinge housing with metallic materials or forms inner components, such as a hinge shaft, a hinge cam operating by interlocking the hinge shaft, and a hinge spring that presses the hinge cam with metal materials, thereby performing ground operation.

However, the ground configuration for improving antenna radiation in the above conventional folder type terminal is designed for optimal antenna radiation performance in primarily an open folder state for call communication, along with some design consideration for the closed folder state. Thus, degradation of antenna radiation characteristic may occur in the closed folder state in which the folder of the terminal is constantly grounded to the hinge module.

SUMMARY OF THE INVENTION

To solve the above problems, an object of the present invention is to provide a folder type portable terminal having a variable-type grounding unit for continually exhibiting an optimal radiation characteristic, regardless whether the folder is open or closed.

Another object of the present invention is to provide a folder type portable terminal having a variable-type grounding unit for improving the performance of an antenna having a relatively low coupling by selective grounding, according to opening and closing of the folder.

A further object of the present invention is to provide a folder type portable terminal having a variable-type grounding unit for improving the performance of the terminal by instrumentally configuring the terminal to be selectively grounded in response to opening and closing of the folder.

To achieve the above objects, the present invention relates to a folder type portable terminal having a grounding unit, a main body having a main board and a folder that opens and closes at an angle from the main body. A hinge module is formed of a metallic material, and opens and closes the folder at an angle from the main body. A connecting means selectively connects a grounding portion of the main board to components of the hinge module in response to the opening and closing of the folder.

According to the present invention, a hinge module electrically connected with a grounding portion and used as the grounding means is connected or disconnected selectively in response to the opening and closing of the folder, thereby adjusting antenna radiation characteristic more advantageously.

Preferably, a folder type terminal produces an optimal antenna radiation characteristic when the folder is open. The folder is designed to improve the antenna radiation characteristic at the closed folder position. In other words, the folder is implemented as the grounding means when open, and is electrically disconnected with a hinge module when closed.

According to the present invention, operating a grounding portion of a main board and a hinge module in a terminal in response to the opening and closing of the folder helps realize more reliable communication quality.

According to the present invention, installed in the terminal is a plate type spring having elasticity and constantly contacting a hinge module. Also installed according to the present invention is a metal ball plunger having an elastic end.

The grounding means in the present invention can also be electrically connected to the outside of the metal hinge housing of the hinge module. The hinge shaft, hinge cam and hinge spring contacting the hinge housing are additional grounding means herein, as they are composed of metallic materials.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions will not be described in detail for the sake of clarity and conciseness.

The present invention describes a folder type terminal with a built-in antenna module. However, an external antenna protruding from the terminal may be applied as well.

Figure 1:
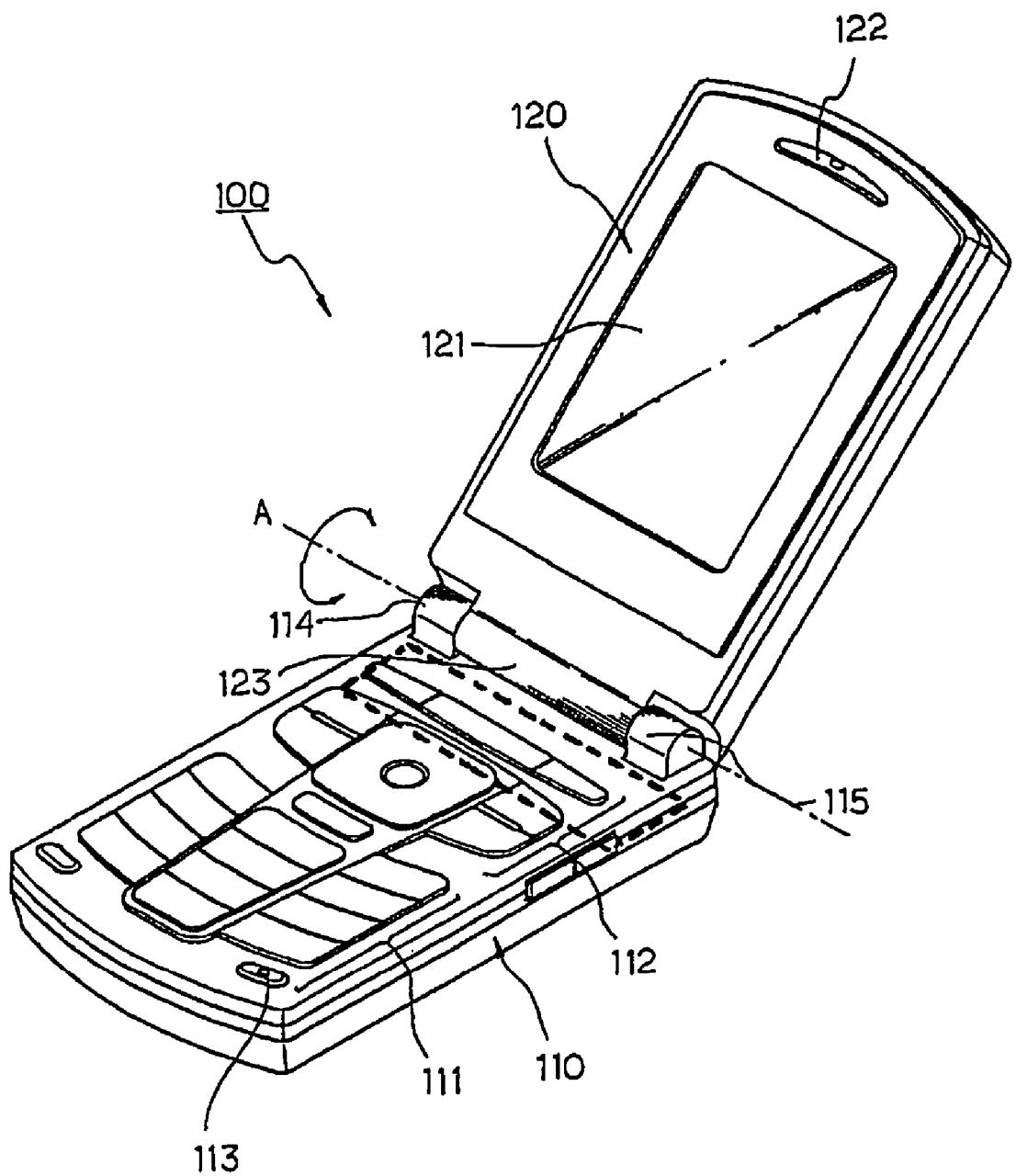
FIG. 1 is a perspective view illustrating a conventional folder type portable terminal.

FIG. 1 is a perspective view illustrating a conventional folder type portable terminal, including a main body 110 and a folder 120 being opened and closed at an angle from the main body 110. The main body 110 includes a number of key button assemblies 111 and 112. The key button assemblies can be a 3×4 keypad assembly 111 and a navigation keypad assembly 112. A microphone 113 is disposed at a lower side of the keypad assembly 111. Further, a built-in antenna module (117 in FIG. 2) is installed. The built-in antenna module 117 may be a plate type radiator, but is not so limited. Various types of antenna radiators can be installed. Moreover, the antenna module is mounted at a backside of the main board 116, as illustrated in FIG. 2.

A display unit 121 is disposed at the folder 120. The display unit 121 may be a liquid crystal display (LCD) module. A speakerphone 122 is disposed at an upper side of the display unit 121.

The folder 120 is folded about the A axis on the main body 110. A center hinge arm 123 is disposed at the folder 120 and side hinge arms 114, 115 are disposed at both sides of the main body 110. Also, a hinge module (10 in FIG. 2) is installed within the center hinge arm 123 and part of the hinge module is fixed to and interlocked with the side hinge arm 114, 115. Thus, in addition to causing opening and closing of the folder 120, the hinge module is responsible for inducting a switch in an intended direction a certain time while the folder operates, but is not so limited. When the center hinge arm 123 being installed the hinge module 10 is formed in the main body 110, the corresponding hinge arm 114 and 115 can be formed in the folder 120.

Figure 2:
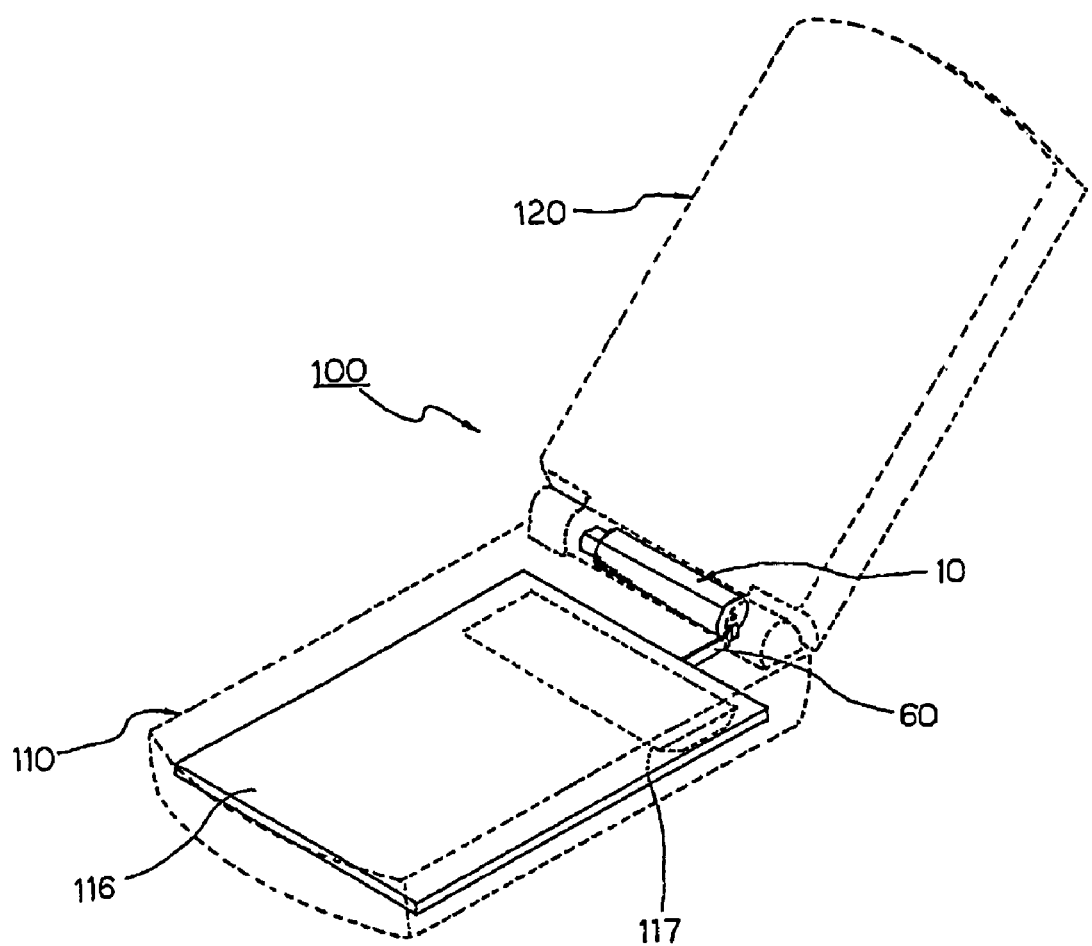
FIG. 2 is a state illustration showing a variable-type grounding unit to be installed on a folder type terminal according to the present invention.

FIG. 2 is a state illustration showing a variable-type grounding unit to be installed on a folder type terminal according to the present invention. A main board 116 is installed on a main body 110 and a built-in antenna module 117 is installed on a backside of the main board 116. The built-in antenna module 117 is grounded to a grounding portion (not shown) of the main board 116. In the present invention, if the hinge module 10 and the grounding portion of the main board 116 are applied together as ground elements, this configuration will change the antenna radiation pattern. In addition, although an antenna module is not electrically connected to the grounding portion, the grounding portion around the antenna module or the hinge module applied as the ground elements are significantly important peripheral elements.

Accordingly, in the present invention, at least one component of the hinge module 10 can be used as a conductor. A hinge housing (20 in FIG. 3) among the components of the hinge module 10 is formed of a metallic material, but is not so limited. A hinge shaft, a hinge cam and a hinge spring are also composed of a metallic material and the entire hinge module can be used as the grounding means. Further, a metal plate type spring 60 is used as a connecting means for electrically connecting the grounding portion of the main board 116 to the hinge module 10. An end of the plate type spring 60 is selectively electrically connected to components of the hinge module 10, i.e., to the outside of the hinge housing 20. The other end of the plate type spring 60 is electrically connected to the grounding portion of the main board 116. At this time, the metal plate type spring 60 can be directly connected so far as the space for installing in the terminal 100 permits, but is not so limited. A session cable or a flexible printed circuit (FPC) can also be used.

Figure 3:
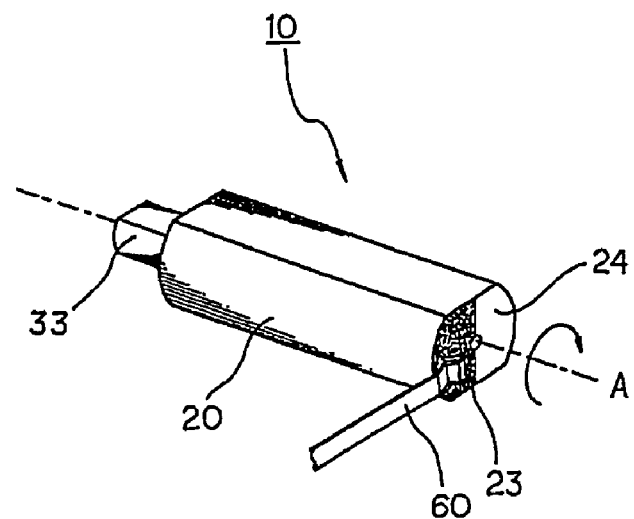
FIG. 3 is a perspective view schematically illustrating parts of a variable-type grounding unit using a hinge module according to a first embodiment of the present invention.

FIG. 3 is a perspective view illustrating parts of a variable-type grounding unit using a hinge module according to a first embodiment of the present invention. A metal plate type spring 60 is implemented for selectively electrically connecting to outsides 23, 24 of hinge housing 20. Because a center hinge arm 123 of a folder 120 is connected to the hinge housing 20, the hinge housing 20 is rotated and the plate type spring 60 is selectively electrically connected to an outside contacting to the hinge housing 20 in response to the opening and closing of the folder 120. Thus, some area 23 of the outside of the hinge housing 20 is used as a means for electric insulation. The area 23 of the hinge housing 20 can be electrically insulated through rubber coating, urethane coating, hard coating or Teflon® coating, or through other well-known means. Thus, the plate type spring 60 contacts a metal area 24 of the hinge housing 20 while the folder 121 is fully open, and contacts an insulated area 23 while the folder 121 is fully closed.

In the present invention, a grounding portion of a main board 116 is electrically connected to a hinge module 10 while a folder 120 is fully open such that the antenna module 117 is in the optimal state. The grounding portion of the main board 116 is electrically disconnected to the hinge module 10 while the folder 120 is fully closed, thereby preventing performance degradation of the antenna module 117.

Figure 4:
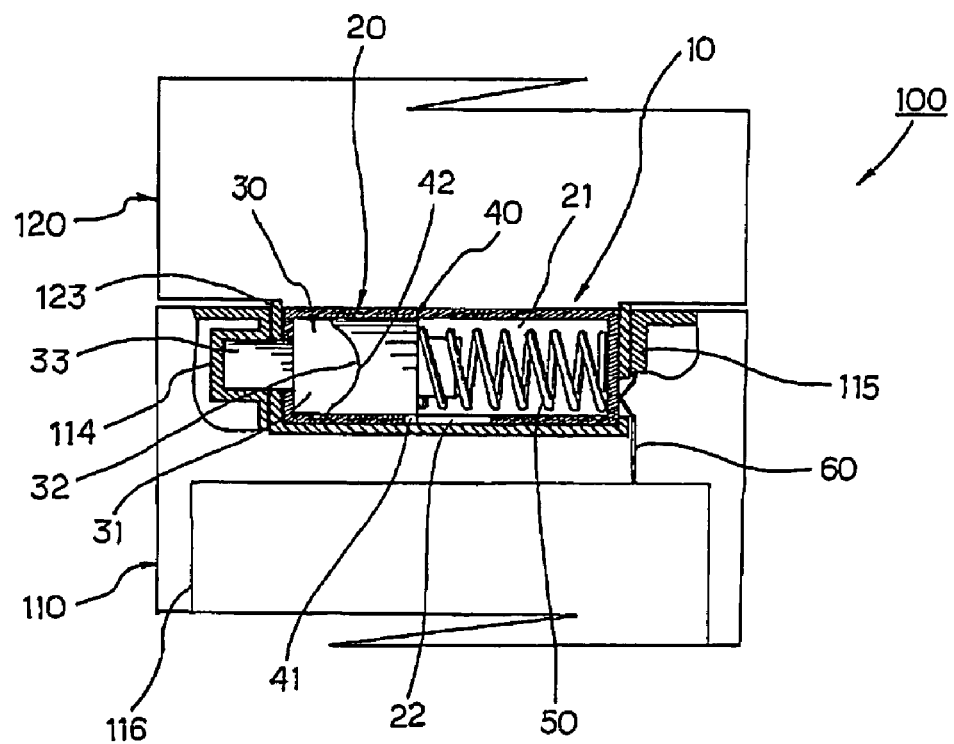
FIG. 4 is a sectional view illustrating parts of a variable-type grounding unit using a hinge module according to the present invention.

FIG. 4 is a sectional view illustrating a state where a variable-type grounding unit using a hinge module is installed on a terminal according to the present invention, and illustrates a state of the terminal implementing the hinge module and the connecting unit.

A hinge module 10 is fixed on a center hinge arm 123 of a folder 120, and a dummy portion 33 of a hinge shaft 30 of the hinge module 10 is fixed on one side the hinge arm 114.

A hollow-type metal hinge housing 20 is installed on the center hinge arm 123 of the folder 120. An end of the hinge housing 20 is opened and the other end of the housing 20 is closed. Thus, a hinge spring 50, a hinge cam 40 and a hinge shaft 30 are sequentially mounted in the opened end of the hinge housing 20. The hinge cam 40 is inserted into the hinge housing 20 and only operates front and rear. Also, a valley-shaped portion 42 is formed in the hinge cam 40. In the hinge shaft 30 installed on a facing of the hinge cam, a hill-shaped portion 32 selectively merging with a valley-shaped portion 42 is formed on a shaft 31 having a larger diameter than the dummy portion 33. Also, the hinge spring 50 has an elasticity for pressing the hinge cam 40 in a direction of the hinge shaft 30. Further, a guide projection 41 is formed and inserted into the hinge housing 20, and a length of a guide slit 22 is formed in a lengthwise direction, thereby operating the hinge cam 40 front and rear. However, it is not so limited, and a section of the hinge cam 40 and the hinge housing 20 inserted the hinge cam 40 can be formed in a non-curved shape, thereby preventing the rotation of the hinge housing 20 while the hinge cam 40 is rotating.

Accordingly, when the folder 120 rotates, the hinge housing 20 and hinge cam 40 fixed in the center hinge arm 123 of the folder 120 rotates, and the hinge cam 40 is urged in a direction of the hinge spring 50 by the curved portion 32 of the hinge shaft 30 since the hinge shaft 30 fixed in the main body 110 does not rotate. At this time, the hinge cam 40 is urged only in a lengthwise direction of the hinge housing 20 since it does not rotate along with the hinge housing 20, thereby providing the feeling of a closed terminal until the curved portion 32 of the hinge shaft 30 meets valley portion 42.

A metal plate type spring 60, which is a connecting means, is installed around one side hinge arm 115 of the main body 110 coupled by the center hinge arm 123 being provided the hinge module 10. An end of the plate spring 60 is installed for constantly connecting on the outside of the closed end with an elasticity, and the other end of the plate 60 is electrically connected to a grounding portion of the main board 116 of the main body 110. The plate type spring 60 can be directly connected as the space for installing in the terminal 100 permits. However, if there is not enough space to install, it can be electrically connected by using such means as a session cable and a flexible printed circuit.

Figure 5:
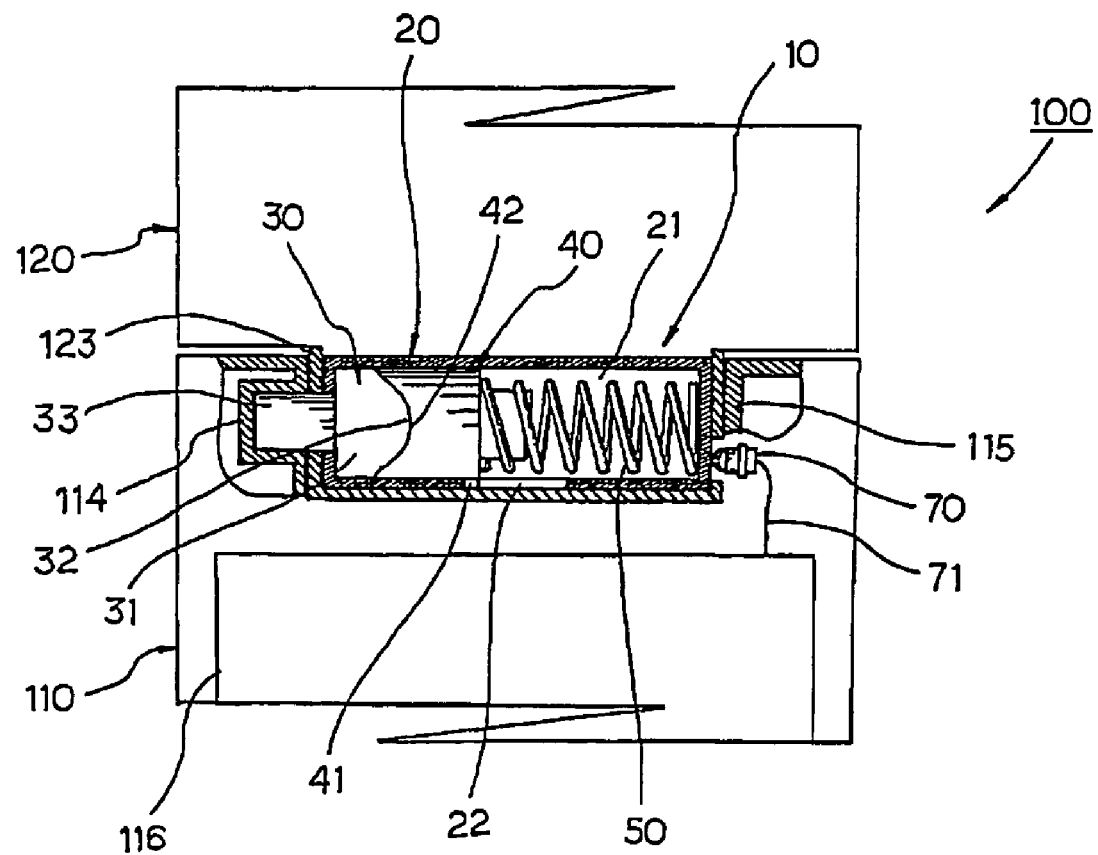
FIG. 5 is a sectional view illustrating a variable-type grounding unit using a hinge module to be installed on a terminal according to the present invention.

FIG. 5 is a sectional view illustrating a state in which a variable-type grounding unit using a hinge module is installed on a terminal according to the present invention, and a metal ball plunger 70 can be used. The ball plunger 70 is small and is easy to install in the side hinge arm 115, but must be connected with the main board 116 of the main body 110 by using a session cable 71 or a flexible printed circuit. An end of the ball plunger 70 is constantly connected to an outside of the hinge housing 20, in contrast to the configuration of the plate type spring (60 in FIG. 4).

Figure 6A:
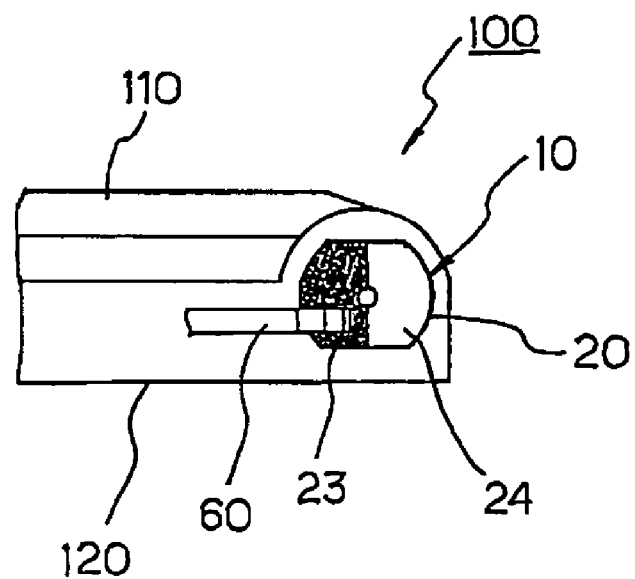
FIGS. 6A and 6B are operational views illustrating a variable-type grounding unit using a hinge module according to the present invention.
Figure 6B:
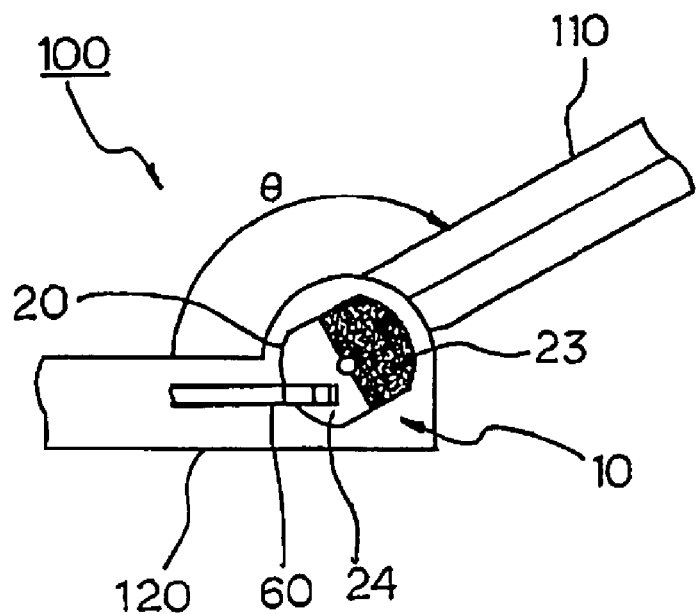

FIGS. 6A and 6B are an operational view illustrating that a grounding state of a variable-type grounding unit using a hinge module is variable by the terminal's operation according to the present invention.

In the present invention, a hinge module 10 is used as a grounding unit only when the folder 120 is open. Thus, an antenna of a terminal is coupled to have the best performance of radiation in a state where the folder 120 is open, that is, in case of call communication by the terminal. In this case, for optimal antenna radiation characteristic, the state grounded to the hinge module 10 of the terminal by a grounding means will be maintained. However, when the folder 120 is closed, the state grounded to the hinge module has a reverse effect. Thus, in the present invention, when the folder 120 is closed, the grounding means is electrically disconnected with the hinge module of the terminal, thereby improving the performance of the antenna radiation.

Accordingly, in the folding state where the folder 120 is closed in the main body 110, a plate type spring 60 which is a grounding means is positioned at an electrically insulated area 23 of the hinge housing 20 of the hinge module 10, and thus, the hinge module 10 does not operate as a grounding unit. However, as shown in FIG. 6B when the folder 120 is opened at an angle θ, the hinge housing 20 along with the folder 120 are rotated by the angle θ. In this case, the plate type spring 60 which is the grounding means is positioned at a conductive area 24 of the hinge housing 20. Thus, the hinge module 10 as well as the grounding portion positioned at the main board 116 of the main body 110 operates as the grounding unit, thereby optimizing the antenna radiation performance.

Figure 7:
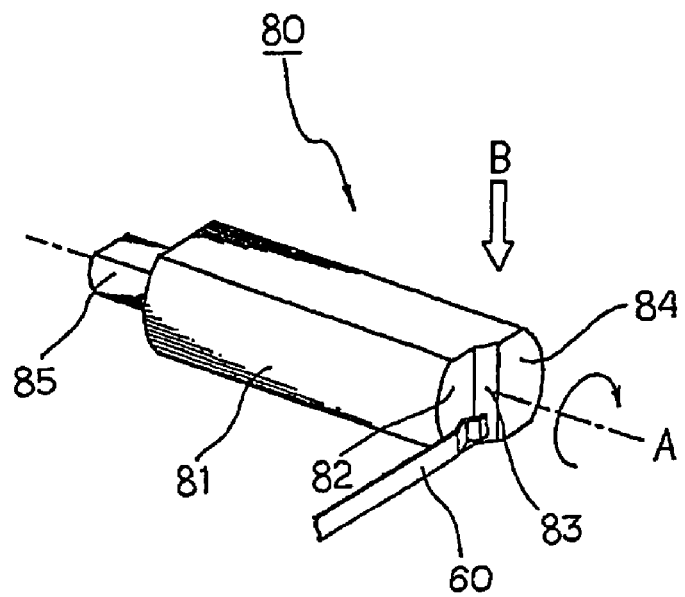
FIG. 7 is a perspective view illustrating parts of a variable-type grounding unit according to a second embodiment of the present invention.

FIG. 7 is a perspective view illustrating a configuration of a variable-type grounding unit according to a second embodiment of the present invention. A plate type spring 60 is selectively connected to an outside of a hinge housing 81. More particularly, a step is formed on surfaces 82, 83, 84 adjoining the plate spring 60 on outsides of the hinge housing 81 and an upper surface 84 and a lower surface 82 are included. Therefore, the plate type spring 60 is electrically connected to the hinge housing 81 when adjoined to the upper surface 84. The plate type spring 60 is electrically disconnected to the hinge housing 81 when it is not adjoined to the upper surface 84. Moreover, the boundary of the upper surface 84 and the lower surface 82 is formed in an incline. When the hinge housing 71 rotates along with the folder 120, their position is changed from the lower surface 82 to the upper surface 84.

Figure 8:
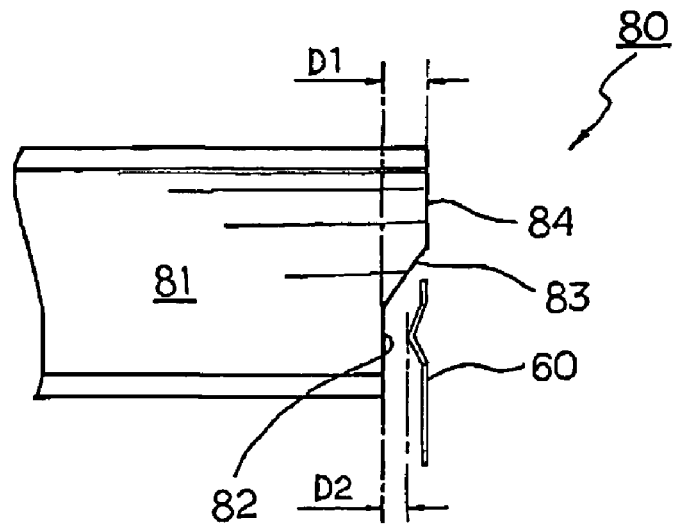
FIG. 8 is a planar view illustrating FIG. 7 in the direction of B.

FIG. 8 is a planar view illustrating FIG. 7 in the direction of B. A part which is positioned to substantially contact with the hinge housing 81 of the plate type spring 60 is disposed at D2, below D1, thereby consistently performing smooth contact operation when the hinge housing 81 rotates along with the folder 120. While not shown, a ball plunger as well as the plate type spring 60 can be used. This embodiment can reduce the cost of production when producing the hinge housing 81 to the exclusion of the above insulating means.

The grounding unit applied to the hinge housing 81 can also perform the above described operation as shown in FIGS. 6A and 6B. That is, when the folder is open, the plate spring 60 will contact with the upper surface 84 between the steps of the hinge housing 81, yet when the folder is folded, the lower surface 82 between the steps of the hinge housing 81 is positioned by corresponding to the plate spring 60 so that they are not in contact with each other.

Figure 9:
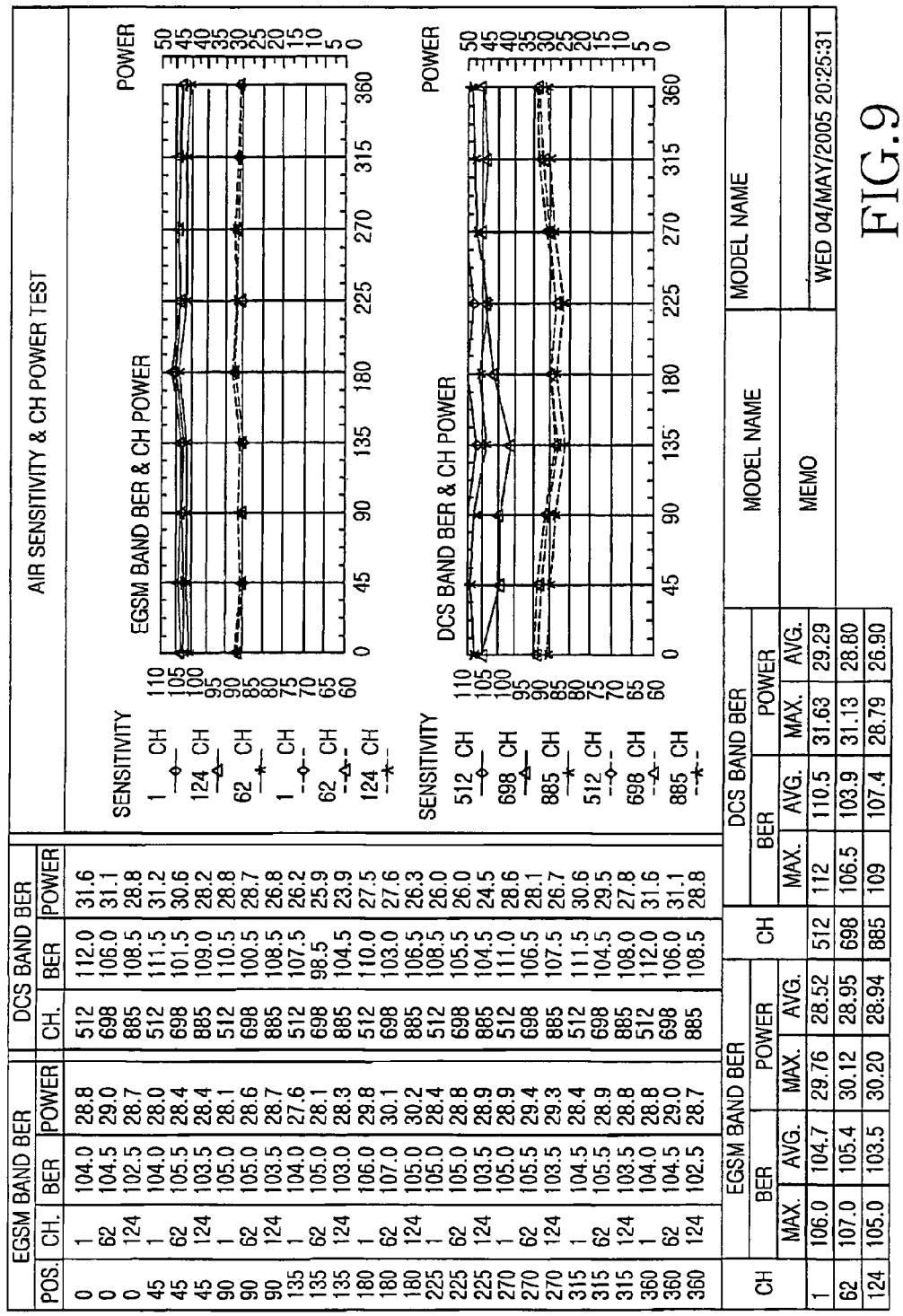
FIG. 9 is a graph illustrating radiation data of a terminal with a variable-type grounding unit while a folder is open according to the present invention.
Figure 10:
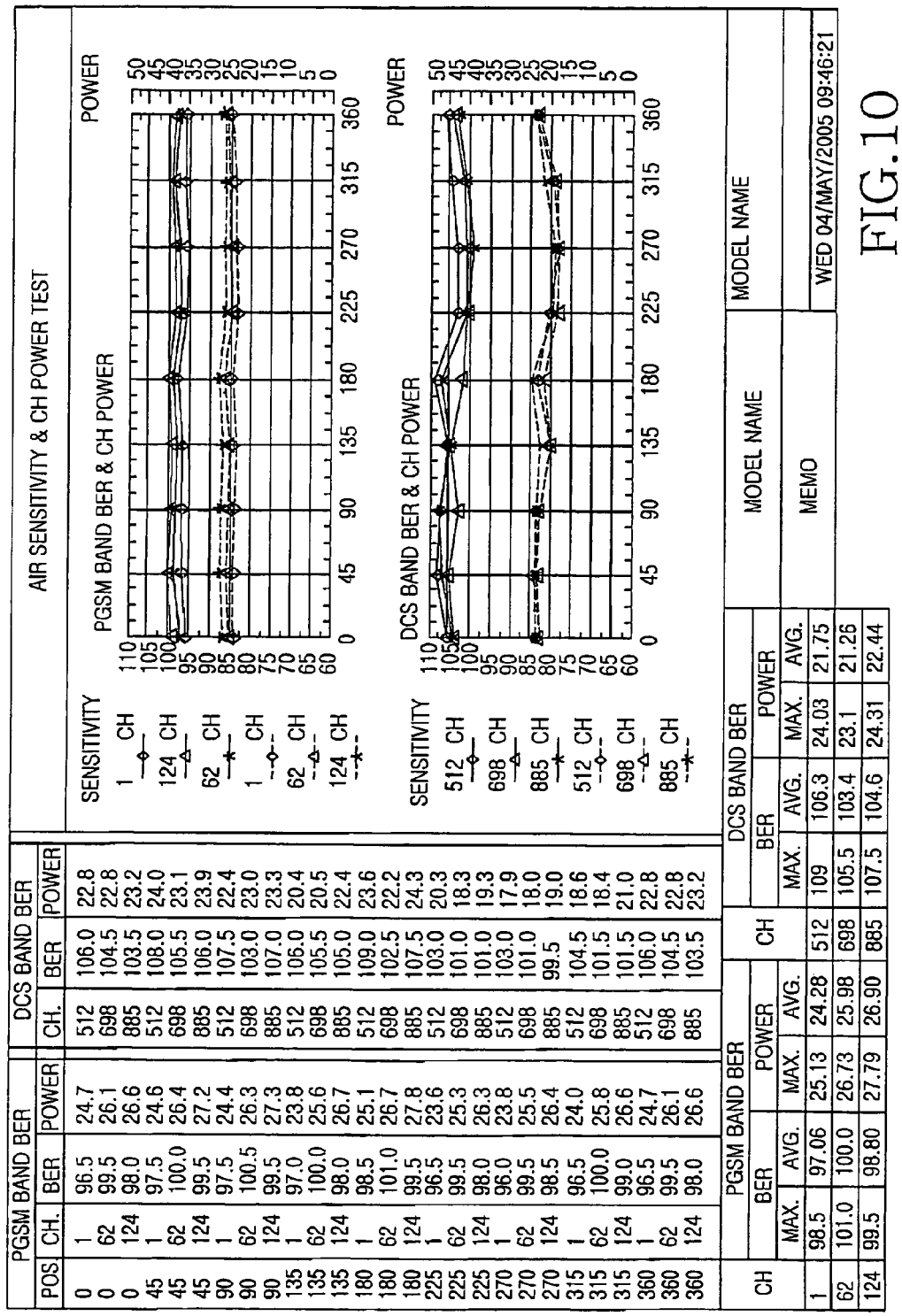
FIG. 10 is a graph illustrating radiation data of a terminal without a variable-type grounding unit while a folder is closed according to the present invention.
Figure 11:
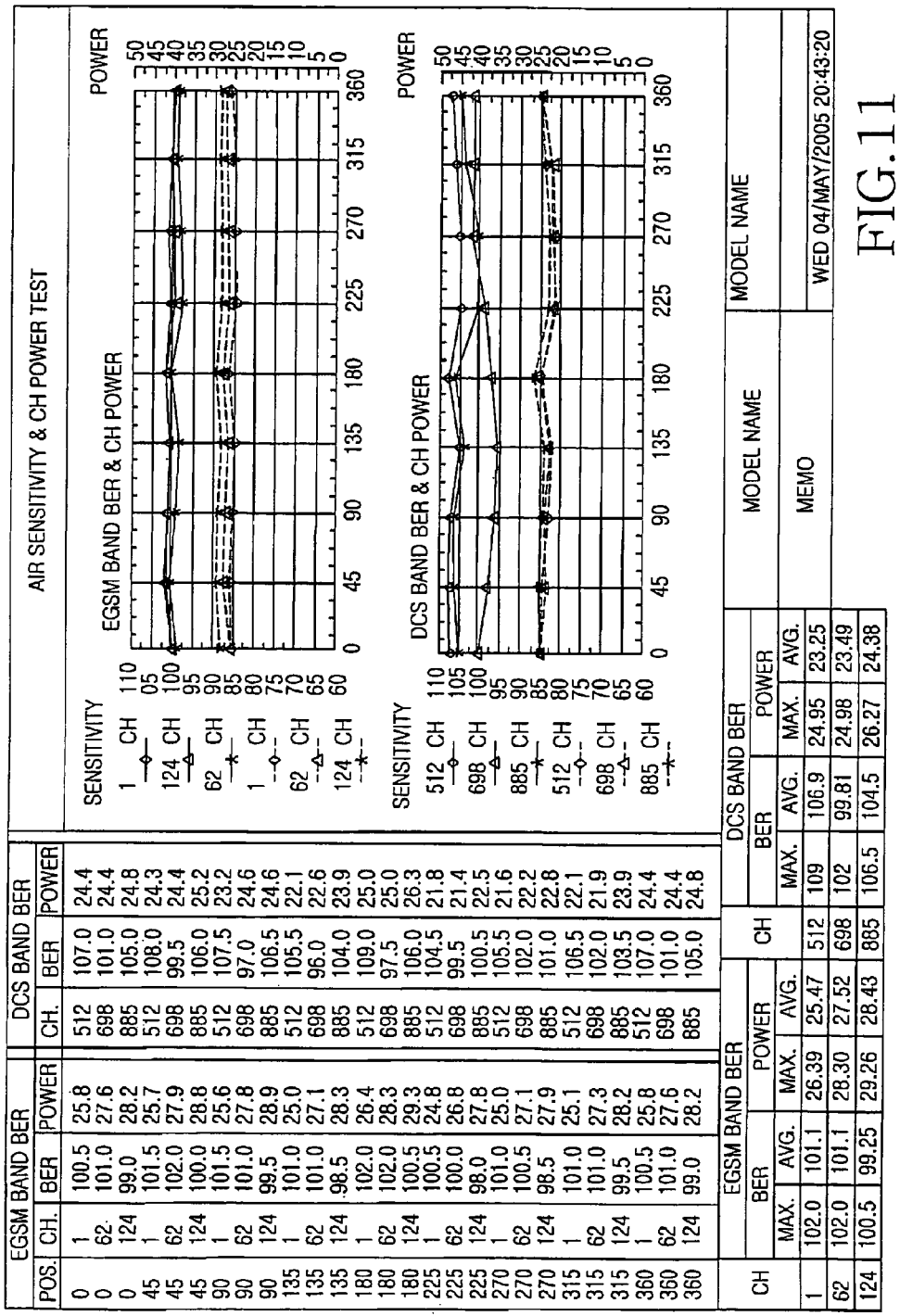
FIG. 11 is a graph illustrating radiation data of a terminal with a variable-type grounding unit while a folder is closed according to the present invention.

FIG. 9 is a graph illustrating radiation data of a terminal with a variable-type grounding unit while a folder is open according to the present invention, FIG. 10 is a graph illustrating radiation data of a terminal without a variable-type grounding unit while a folder is closed, and FIG. 11 is a graph illustrating radiation data of a terminal with a variable-type grounding unit while a folder is closed according to the present invention.

FIG. 9 illustrates the optimal performance of antenna radiation when a folder is open. A graph of FIG. 11 more closely resembles a graph of FIG. 9 than a graph of FIG. 10, which is a result of a conventional configuration being grounded continuously to a hinge module when a terminal is closed.

A portable terminal having a variable-type grounding unit according to the present invention has an improved antenna radiation characteristic regardless of whether the folder is open or closed.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A folder type portable terminal having a variable-type grounding unit, comprising,
   a main body having a main board;
   a folder for performing opening and closing operation at a predetermined angle from the main body;
   a hinge module for opening and closing the folder at the predetermined angle from the main body, said hinge module having at least one component formed of a metal material; and
   a connecting means for selectively connecting a grounding portion of the main board to the at least one component formed of a metal material of the hinge module in response to the opening and closing operation of the folder.

2. The folder type portable terminal of claim 1, wherein the connecting means selectively electrically connects to the hinge module in response to the opening and closing operation of the folder.

3. The folder type portable terminal of claim 2, wherein the connecting means electrically connects or disconnects to the hinge module at a position where the folder is fully open or closed.

4. The folder type portable terminal of claim 3, wherein the connecting means electrically connects to the hinge module at the position where the folder is fully open, and electrically disconnects to the hinge module at the position where the folder is fully closed.

5. The folder type portable terminal of claim 4, the hinge module comprising,
   a hollow metal hinge housing fixed to the folder, and installed to rotate with the folder in response to the opening and closing operation of the folder, and having a surface with a closed end;
   a hinge cam mounted in the hinge housing and having a valley-shaped portion with a curvature, and operating about an axis in the hinge housing;
   a hinge shaft having a curved portion adapted to adjoin and conform to the curvature of the valley-shaped portion of the hinge cam, and protruding from an end of the hinge housing and fixed to the main body; and
   a hinge spring for urging the hinge cam in a direction of the hinge shall.

6. The folder type portable terminal of claim 5, wherein the hinge cam, the hinge shaft and the hinge spring are also formed of a metallic material and form the connecting means.

7. The folder type portable terminal of claim 6, wherein the connecting means is constantly connected with an outside of a closed surface of the hinge housing, and rotates concurrently with the folder.

8. The folder type portable terminal of claim 7, wherein an area outside of the hinge housing connected with the connecting means is electrically disconnected by an insulating means.

9. The folder type portable terminal of claim 8, wherein an area of hinge housing where the connecting means is electrically insulated is implemented by one of a urethane coating, rubber coating, hard coating and Teflon® coating.

10. The folder type portable terminal of claim 9, wherein the connecting means is a metal plate type spring having an elastic first end that is electrically connected to the grounding portion of the main board and a second end that constantly contacts an outside of the hinge housing.

11. The folder type portable terminal of claim 9, wherein the connecting means is a metal ball plunger having an elastic first end that is electrically connected to the grounding portion of the main board and a second end that constantly contacts an outside of the hinge housing.

12. The folder type portable terminal of claim 10, wherein the elastic first end of the metal plate type spring is electrically connected, directly or by a session cable or a flexible printed circuit (FPC), to the grounding portion of the main board.

13. The folder type portable terminal of claim 11, wherein the elastic first end of the metal ball plunger is electrically connected, directly or by a session cable or a flexible printed circuit (FPC), to the grounding portion of the main board.

14. The folder type portable terminal of claim 1, wherein the connecting means selectively performs electrical contact with the hinge module in response to the opening and closing operation of the folder.

15. The folder type portable terminal of claim 14, wherein the connecting means is electrically connected to or disconnected from the hinge module at a position where the folder is fully open or closed, respectively.

16. The folder type portable terminal of claim 15, wherein the connecting means is electrically connected to the hinge module at a position where the folder is fully open and disconnected from the hinge module at a position where the folder is fully closed.

17. The folder type portable terminal of claim 16, the hinge module comprising,
   a hollow metal hinge housing fixed to the folder, and installed to rotate with the folder in response to the opening and closing operation of the folder, and formed with a step-like upper surface;
   a hinge cam mounted in the hinge housing and having a valley-shaped curved portion operating about an axis in the hinge housing;
   a hinge shaft had a curved portion for adapted to adjoin and conform to the valley-shaped curved portion of the hinge cam, and protruding from an end of the hinge housing and fixed to the main body; and
   a hinge spring for urging the hinge cam in a direction of the hinge shaft.

18. The folder type portable terminal of claim 17, wherein the hinge cam, the hinge shaft and the hinge spring are formed of a metallic material and form the connecting means.

19. The folder type portable terminal of claim 18, wherein a first area outside of the hinge housing connected to the connecting means has lower surface than a second area outside of the hinge housing, and the grounding unit is selectively connected to an outside of the terminal in response to the opening and closing operation of the folder.

20. The folder type portable terminal of claim 19, wherein a boundary between a selected area outside of the hinge housing connected to the connecting means and a remaining area is formed in an incline, and the connecting means smoothly connects from the selected area to the remaining area.

21. The folder type portable terminal of claim 20, wherein the connecting means is a metal plate type spring having an elastic first end that is electrically connected to a grounding portion of a main board in the main body and a second end that is selectively connected to an outside of the hinge housing.

22. The folder type portable terminal of claim 20, wherein the connecting means is a metal ball plunger having a elastic first end that is electrically connected to the grounding portion of the main board in the main body and a second end that selectively contacts an outside of the hinge housing.

23. The folder type portable terminal of claim 21, wherein the elastic first end of the metal plate type spring and the metal ball plunger is electrically connected, directly or by a session cable or a flexible printed circuit (FPC), to the grounding portion of the main board.

24. The folder type portable terminal of claim 22, wherein the elastic first end of the metal plate type spring and the metal ball plunger is electrically connected, directly or by a session cable or a flexible printed circuit (FPC), to the grounding portion of the main board.

* * * * *